(12) United States Patent
Meldahl et al.

(10) Patent No.: US 7,310,956 B2
(45) Date of Patent: Dec. 25, 2007

(54) REFRIGERANT CHARGING BY OPTIMUM PERFORMANCE

(75) Inventors: Kenneth Meldahl, Fox Lake, IL (US); Dean Pfefferle, Elgin, IL (US); Craig Govekar, Gurnee, IL (US); Anwar Suharno, Barrington, IL (US); Larry Moller, Harvard, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 512 days.

(21) Appl. No.: 10/990,547

(22) Filed: Nov. 18, 2004

(65) Prior Publication Data

US 2006/0101835 A1 May 18, 2006

(51) Int. Cl.
*F25B 45/00* (2006.01)
(52) U.S. Cl. ............................................. 62/77; 62/149
(58) Field of Classification Search ................... 62/149, 62/77, 126, 129, 292, 127
See application file for complete search history.

(56) References Cited

U.S. PATENT DOCUMENTS

| 4,796,436 | A | * | 1/1989 | Voorhis et al. | ................. | 62/77 |
| 5,214,918 | A |   | 6/1993 | Oguni et al. |   |   |
| 6,470,695 | B2 | * | 10/2002 | Gong | ........................... | 62/129 |
| 7,104,075 | B2 | * | 9/2006 | Meeker | .......................... | 62/77 |

| 2002/0083723 | A1 |   | 7/2002 | Demuth et al. |   |   |
| 2005/0262855 | A1 | * | 12/2005 | Hsieh et al. | ................... | 62/126 |

FOREIGN PATENT DOCUMENTS

| EP | 0 271 429 | 6/1988 |
| EP | 0 813 033 | 12/1997 |

OTHER PUBLICATIONS

International Search Report, Feb. 21, 2006.
International Preliminary Report on Patentability issued in International Application No. PCT/US2005/033919, dated Dec. 27, 2006.

* cited by examiner

*Primary Examiner*—Mohammad M. Ali
(74) *Attorney, Agent, or Firm*—McDermott Will & Emery LLP

(57) ABSTRACT

A charging system for charging a refrigeration system of a vehicle includes a controller, a refrigerant source, at least one line fluidly connecting the refrigerant source to the refrigeration system; a control valve disposed to control flow of the refrigerant from the refrigerant source to the refrigeration system, and an efficiency sensor for measuring the efficiency of the refrigeration system. The controller operates to cause the charging system to input into the refrigeration system a predetermined amount of refrigerant less than a recommended refrigerant charge amount; measure a baseline efficiency of the refrigeration system, input a supplemental amount of refrigerant into the refrigeration system, measure an adjusted efficiency of the refrigeration system, and compare the measured adjusted efficiency to the baseline efficiency using the controller.

14 Claims, 2 Drawing Sheets

REFRIGERANT CHARGING BY OPTIMUM PERFORMANCE

TECHNICAL FIELD

The disclosure relates to a system and method of charging air conditioning and refrigeration systems or units, such as those used in automobiles, boats or ships, or other types of vehicles.

BACKGROUND ART

Most refrigeration systems are not 100% free of leaks. Thus, the amount (or mass) of refrigerant within the refrigeration system decreases over time. Refrigeration systems, however, are designed to operate with a specific amount of refrigerant. Therefore, loss of refrigerant in a refrigeration system over time typically reduces the efficiency of the refrigeration system. Also, if the amount of refrigerant in the refrigeration system drops to a certain level, the refrigeration system may cease to operate and/or be damaged. For these reasons, a common maintenance operation for a refrigeration system is to recharge the refrigerant within the refrigeration system.

The recharging operation typically involves evacuating the refrigeration system of any remaining refrigerant and, if present, other materials within the refrigeration system. Once the refrigeration system is evacuated, a predetermined amount of new refrigerant is introduced into the refrigeration system. An important component of conventional refrigeration charging systems is the device that measures the amount of refrigerant introduced into the refrigeration system. Since the refrigeration system is designed to operate with a specific amount of refrigerant, too little or too much refrigerant can reduce the effectiveness of the refrigeration system.

One conventional device used to measure the amount of refrigerant introduced into the refrigeration system is a load cell (or scale). Essentially, the load cell measures the weight of a tank containing the refrigerant before the refrigerant is introduced into the refrigeration system and then afterwards. The difference between the two readings is the amount of refrigerant introduced into the refrigeration system. There are, however, certain problems that are associated with the use of a load cell in conventional charging systems. Load cells are sensitive to vibration, which can throw off the measurements. Also, since the load cell determines the weight of the entire tank used to supply the refrigerant, when the weight of the tank is increased, the sensitivity of the load cell is reduced.

Furthermore, recent advances in refrigeration technology employ carbon dioxide as the refrigerant, which is stored at a pressure as much as ten times higher than the pressure at which conventional refrigerants are stored, and the resulting increase in storage pressure necessitates thicker walls for the tank. These thicker walls add additional weight to the tank, which further decreases the sensitivity of the load cell.

As those skilled in the art appreciate, the manufacturers specifications are generally accurate, but provide ranges of acceptable charge to account for variances, even between identical vehicle models. Some manufacturers, such as Mercedes-Benz, Volvo, Saab and Fiat publish single or exact numbers for the required charge (e.g., 800 grams). Other manufacturers, such as BMW, Ford, VW and Peugeot, provide a target number with a tolerance range (e.g., 750 grams +/−50 grams). Yet other manufacturers, such as many Japanese manufacturers, specify an overall range (e.g., 500-600 grams), and this variation can lead to confusion. There is, therefore, a need for a refrigerant charging system and method that is more accurate and vibration-resistant, and by which technicians may independently assess an optimal refrigerant charge for the refrigeration system.

SUMMARY OF THE DISCLOSURE

The present disclosure provides an example of a system and method of charging air conditioning and refrigeration systems or units.

In one aspect, a charging system is provided for charging a refrigeration system of a vehicle. The charging system includes a controller, a refrigerant source for carbon dioxide as the refrigerant, at least one line fluidly connecting the refrigerant source to the refrigeration system; a control valve disposed to control flow of the refrigerant from the refrigerant source to the refrigeration system, and an efficiency sensor for measuring the efficiency of the refrigeration system.

In another aspect, the controller operates to cause the charging system to input into the refrigeration system a predetermined amount of refrigerant less than a recommended refrigerant charge amount; measure an efficiency of the refrigeration system using the data from the efficiency sensor to establish a baseline efficiency; input a supplemental amount of refrigerant from the refrigerant source into the refrigeration system, measure an adjusted efficiency of the refrigeration system using data from the efficiency sensor, and compare the measured adjusted efficiency to the baseline efficiency using the controller.

Other aspects and advantages of the present disclosure will become apparent to those skilled in this art from the following description of preferred aspects taken in conjunction with the accompanying drawings. As will be realized, the disclosed concepts are capable of other and different embodiments, and its details are capable of modifications in various obvious respects, all without departing from the spirit thereof. Accordingly, the drawings, disclosed aspects, and description are to be regarded as illustrative in nature, and not as restrictive.

BRIEF DESCRIPTION OF THE DRAWINGS

The foregoing and other features, aspects and advantages of the present concepts are described in the following detailed description which examples are supplemented by the accompanying drawings, in which.

DETAILED DESCRIPTION OF THE PREFERRED EMBODIMENTS

Figure 1:
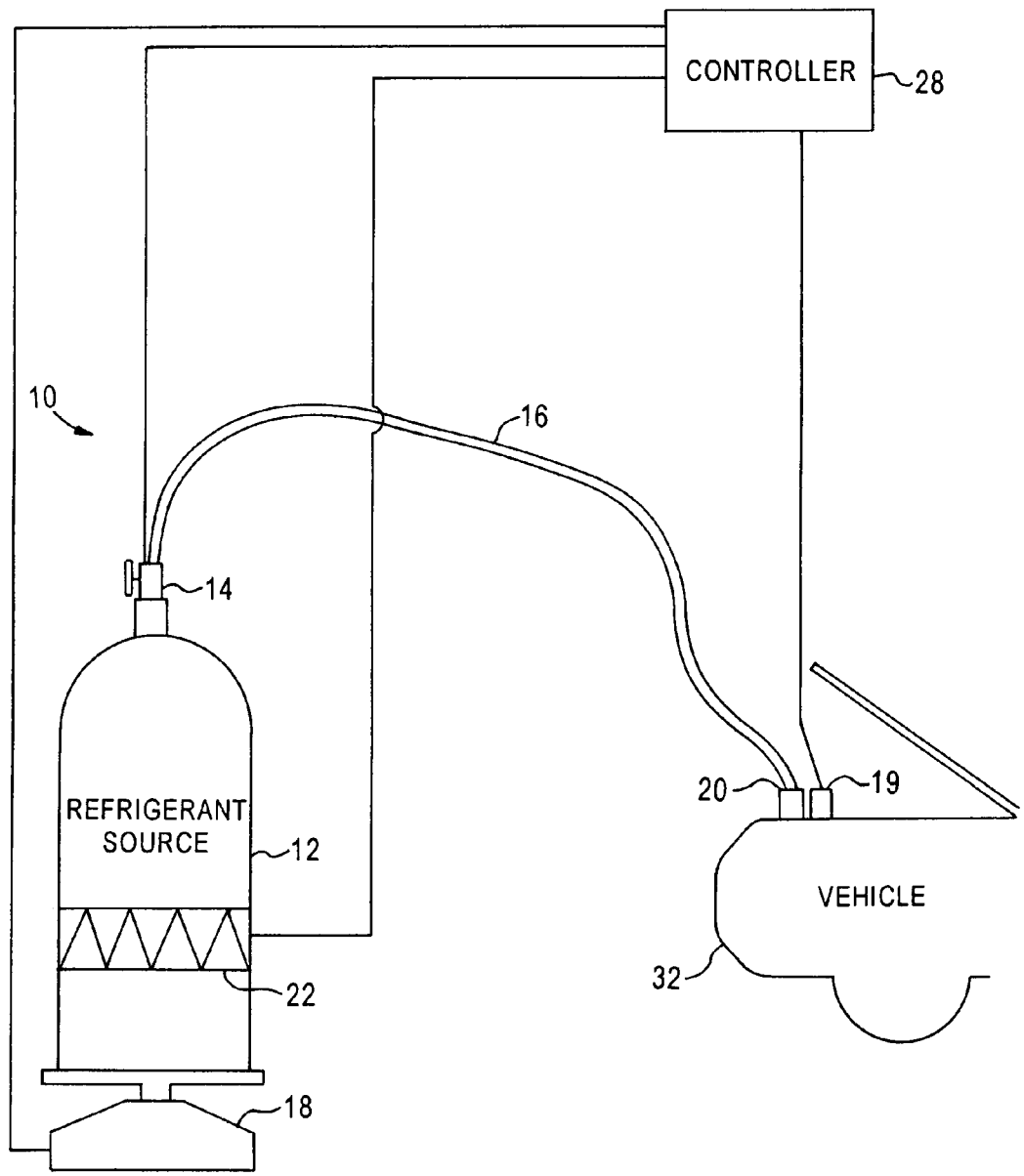
FIG. 1 shows an example of a charging system, according to the disclosure.

In accord with the disclosed concepts, there is provided, as shown in FIG. 1, a charging system 10 for charging a refrigeration system of a vehicle 32, such as an automobile. The charging system 10 includes a refrigerant source 12, a scale 18, a controller 28, and a control valve 14. The controller (or computer) 28 may include a processor, a memory device, and a display device. The refrigerant source 12 includes a refrigerant, such as carbon dioxide, and the scale 18 measures a weight of the refrigerant source 12. The weight measured by the scale 18 is output to controller 28. A heat band 22 is optionally disposed about the refrigerant source 12. A line 16, or optionally more than one line, depending upon the configuration of the charging system 10, may be provided with conventional couplers 20 for connection, at one end, to a connection point on a refrigeration system of the vehicle 32, and at another end, to the refrigerant source 12.

The control valve 14 may be disposed anywhere in the flow path of the refrigerant from the refrigerant source 12 to the refrigeration system of the vehicle 32 to control flow of the refrigerant from the refrigerant source 12 to the refrigeration system of the vehicle 32. As shown in FIG. 1, actuation of the control valve 14 may be controlled by signals output from the controller 28. Alternatively, the control valve 14 may be manually actuated.

The controller 28 may be connected to at least one efficiency sensor 19 that measures the efficiency of the refrigeration system. The efficiency sensor 19 may be included as part of the charging system 10. Alternatively, the efficiency sensor 19 may already be present within the refrigeration system and/or the vehicle 32. In one aspect of the charging system 10, the efficiency sensor 19 is adapted for placement adjacent an outlet of the vehicle refrigeration system, or at another position, which may be internal to the either the engine compartment or passenger compartment of the vehicle. The output of the efficiency sensor 19 may then be fed into the controller 28.

Figure 2:
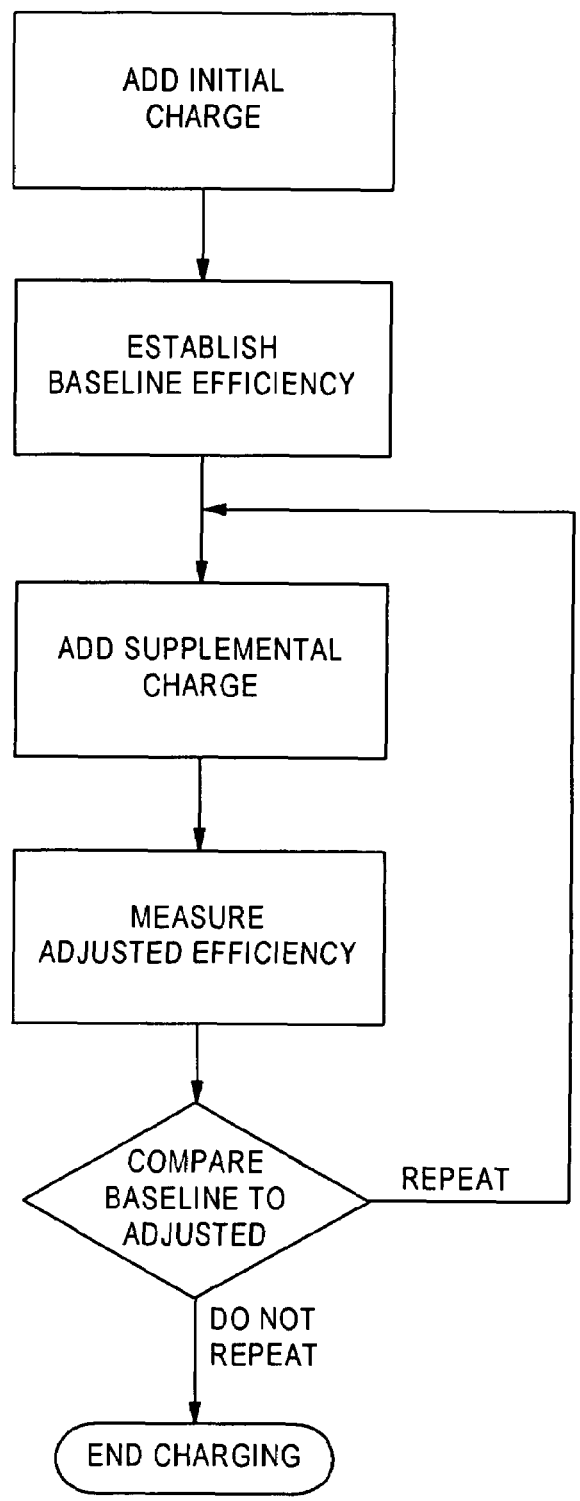
FIG. 2 is a flow chart of a method of charging a refrigeration system, according to the disclosure.

A method of operating the charging system is illustrated in FIG. 2. For example, the controller 28 includes an executable instruction set arranged, when executed by the processor, to cause the processor to perform the steps of: (1) controlling the control valve 14 to input into the refrigeration system a predetermined amount of refrigerant less than the recommended refrigerant charge amount; (2) measuring a baseline efficiency of the refrigeration system with the efficiency sensor 19 after the refrigeration system has attained a substantially steady state condition; (3) controlling the control valve 14 to input a supplemental amount of refrigerant into the refrigeration system; (4) measuring an adjusted efficiency of the refrigeration system with the efficiency sensor 19 following the inputting into the refrigeration system of the supplemental amount of refrigerant and after the refrigeration system has attained a substantially steady state condition; and (5) comparing the measured adjusted efficiency of the refrigeration system to the baseline efficiency of the refrigeration system. Additional steps may be included before or after any of the aforementioned steps.

Additional aspects of the instruction set may comprise, for example, executable instructions which, when executed by the controller 28, cause the controller 28 to perform the further steps of (6) repeating the steps of measuring the baseline efficiency, inputting the supplemental amount of refrigerant, measuring the adjusted efficiency, and comparing the baseline efficiency to the adjusted efficiency; and (7) measuring the baseline efficiency, inputting the supplemental amount of refrigerant, measuring the adjusted efficiency, and comparing the baseline efficiency to the adjusted efficiency are repeated until a comparison of the measured adjusted efficiency to the baseline efficiency yields a predetermined result.

In the current system and method, the charging would be initiated by connecting the charging system 10 to the refrigeration system of the vehicle 32 in accord with the manufacturer's recommendations and determining the refrigerant system manufacturer's recommended charge amount, for example, by a technician physically looking up the value in an electronic or hardcopy database, by a microprocessor (e.g., a shop computer, a handheld processing device, or a microprocessor connected to the charging equipment) accessing (e.g., downloading or uploading) the information from a local or remote memory following input of information uniquely identifying the refrigeration unit or class of refrigeration unit, or even by relying on the expertise of the technician in charge of the charging procedure.

The recommended charge amount would be input into the microprocessor or controller 28 of the charging system 10. When the charging is started, the controller 28 opens the control valve 14 until a predetermined amount less than the recommended charge amount is charged into the vehicle 32. Any manner of determining the predetermined amount is acceptable for use in the present system and method, for example, the predetermined amount may be determined by a scale 18, such as typically used for such purpose. Advantageously, since the accuracy of the scale is not required to be as high as that for conventional refrigerant charging methods for reasons disclosed below, there is no need for a high-resolution scale to measure the amount of refrigerant that is charged into the refrigeration system.

In one aspect of the present concepts, this predetermined amount may range from about 70% to about 95% of the recommended charge amount. It is preferred to set the predetermined amount to a value between approximately about 80% to about 85% of the recommended charge amount. The predetermined amount percentages may be taken with respect to a manufacturer's only specified value (e.g., 800 grams), base value without tolerances (e.g., 750 grams for recommended charge amount of 750 grams+/−50 grams), or midpoint of a specified range. The predetermined amount may also advantageously be set with respect to other values including, but not limited to, a level below a manufacturer's only specified value (e.g., a value less than 800 grams, if 800 grams is specified as the recommended charge amount), base value with the lower tolerance (e.g., 700 grams for recommended charge amount of 750 grams+/−50 grams), or low value in a specified range.

Broadly, in accord with the present concepts, the weight of refrigerant initially input into the refrigerant system is generally less than the recommended charge for the refrigerant system by some non-trivial amount (e.g., by an amount more than the accuracy of the refrigerant load scale). The predetermined amount of initial refrigerant charge is intended only to get the initial weight of refrigerant in the refrigeration system "in the ballpark" to a point at which the efficiency of the refrigeration system may be reliably monitored. It should be noted, however, that in certain instances, the weight of refrigerant initially input into the refrigeration system may be more than the recommended charge from the refrigeration system.

Concurrently with or immediately preceding the completion of initial charging of refrigerant in the refrigerant system to the predetermined amount, the control valve 14 is closed. The term control valve 14 is intended to broadly include any means by which a device may be used to control, divert or stop the flow of refrigerant into the refrigeration system. The control valve 14 may be actuated by a motor, solenoid, or other conventional actuating device, or may be manually actuated, such as by rotation of a handle attached to the valve stem. The weight of refrigerant input into the refrigerant system may also be controlled by means other than a control valve 14, or in combination with a control valve 14, including, but not limited to, a variable speed pump or positive displacement pump.

Following the initial charging of the refrigeration system, the refrigeration system is operated. In the case of a vehicle 32, the vehicle 32 is started and the refrigeration system of the vehicle 32 is operated. It is preferred, but not necessary, to operate the refrigeration system at the coldest setting for the subsequent steps (e.g., for a vehicle 32, the refrigeration system is set to the coldest setting). The refrigeration system may be operated at a setting other than the coldest setting in accord with the concepts disclosed herein.

In accord with the present concepts, the efficiency of the refrigeration system is measured, for example, by placing an efficiency sensor 19, such as a temperature probe at an outlet or output vent of the refrigeration system to measure a temperature of the chilled fluid (e.g., air) being output by the refrigeration system. The temperature probe 19 may be placed in an interior of the outlet or output vent refrigeration system, or may alternatively be placed adjacent thereto or in the vicinity thereof, but generally within a few inches of such outlet or output vent. The placement of the temperature probe may be achieved, for example, by a clamp, by a configurable stand adapted to move (e.g., translate and/or rotate) along or about one or more axes, or simply by selecting a temperature probe that is physically configured to permit insertion into the outlet or output vent. As another example, the efficiency sensor 19 may already built in to the refrigeration system of the vehicle 32 and the controller 28 connects to an output port of the efficiency sensor 19. Other types of sensors 19 capable of measuring efficiency of a refrigeration system are also acceptable for use with the charging system and method.

The temperature probe 19 may output its measured data to the charging equipment controller 28, such as by a data line or by a carrier signal or pulsed signal, to enable automatic control of the control valve 14. Alternatively, temperature data from the temperature probe 19 may be output to a local display or indicator to enable a technician to locally monitor the temperature and control operation of the control valve 14.

In accord with the present concepts, the control valve 14 is intermittently opened for short intervals to provide discrete and measured bursts of refrigerant into the refrigeration system. The actual weight or quantity of refrigerant emitted by each burst may be tailored by an appropriate control over the degree of opening of the control valve 14, control over the duration for which the control valve 14 is held in an open or partially-opened position, and even by use of separate by-pass lines containing flow restrictors, orifices, small-diameter tubing, or other means or combination of means by which the flow may be controlled to provide a technician or controller 28 (e.g., microprocessor) sufficient time to ensure that a discrete burst of an appropriate amount is discharged into the refrigeration system. Likewise, other control schemes may be implemented in accord with the present concepts to achieve discrete bursts of refrigerant into the refrigeration system.

The refrigerant source 12 may optionally be heated to facilitate transfer of the refrigerant from the tank into the refrigeration system. This heating may be accomplished by a heating band 22 or heat trace, or the like, to place the refrigerant source 12 at a higher pressure than that of the refrigerant system to which it is to be attached.

In one aspect, the discrete bursts of refrigerant may comprise supplemental charges of about 0.5 to 5.0% of the recommended charge amount and, still more preferably, between about 1%-2% of recommended charge amount. Alternatively, on an absolute scale, the supplemental charge could comprise a fixed amount such as, but not limited to, a charge of about 0.1 ounce or about 2-3 grams. The supplemental charge could comprise, for example, a fixed amount such as about 0.25 ounce or about 7 grams. The supplemental charge may also be varied during the course of charging. In one example, if the initial predetermined amount of refrigerant input into the refrigeration system is 80% of the recommended refrigerant charge amount, the initial supplemental charge may be 5.0%, the next charge 4%, the subsequent charge 3%, and so on until a present value, such as the recommended refrigerant charge amount or full charge is reached, at which time the supplemental charges may be reduced to a lower value such as 1%, 0.50%, 0.25%, or other selected value.

In certain aspects of the system and method, the controller 28 trends the efficiency (e.g., the temperature of the air output by the operating refrigeration system) of the refrigeration system to determine whether or not the efficiency is increasing, staying substantially constant, or decreasing the addition of each supplemental charge of refrigerant. It is expected that each the initial supplemental charges of refrigerant will improve the functioning of the refrigerant system and the efficiency of the refrigeration system will increase, evidenced, for example, by a decrease in temperature of the air output by the operating refrigeration system.

Eventually, for example, within about 5% to about 10% of the manufacturer's recommended charge amount, it is expected that the supplemental charges of refrigerant will only modestly improve the functioning of the refrigerant system, if at all. In other words, a plateau will be reached and the efficiency of the refrigeration system will stay substantially constant. If additional supplemental charges of refrigerant are added once this plateau has been reached, the refrigeration system will start to become overcharged and the supplemental charges will negatively impact the efficiency and functioning of the refrigerant system. Somewhere during this plateau of efficiency, the addition of supplemental charges of refrigerant to the refrigeration system may be halted by the controller 28. After the addition of supplemental charges of refrigerant into the refrigeration system has halted, an amount, equal to the last supplemental charge of refrigerant added to the refrigeration system, may be removed from the refrigeration system.

Thus, in accord with the present method and system, the refrigeration system will be provided with its optimal charge and run at its highest efficiency, as verified during the charging process. Since only a predetermined amount of the manufacturer's recommended charge amount, by a rough percentage, is initially input into the system, no risk of overcharging the system exists, and a high-resolution scale is not required since the efficiency of the refrigeration system, as opposed to weight, is used to determine the optimal charge.

The embodiments described herein may be used with any desired fixed or mobile refrigeration system, including but not limited to a vehicle refrigeration system. Various aspects of the present concepts have been discussed in the present disclosure for illustrative purposes. It is to be understood that the concepts disclosed herein is capable of use in various other combinations and environments and is capable of changes or modifications within the scope of the concepts expressed herein. Moreover, although examples of the system and method were discussed, the present concepts are not limited by the examples provided herein and additional variants are embraced by the claims appended hereto.

What is claimed is:

1. A method of charging a refrigeration system, the method comprising the steps of:
  inputting into the refrigeration system a predetermined amount of refrigerant less than a recommended refrigerant charge amount;

establishing a baseline efficiency by measuring an efficiency of the refrigeration system;

inputting a supplemental amount of refrigerant into the refrigeration system;

measuring an adjusted efficiency of the refrigeration system; and comparing the measured adjusted efficiency to the baseline efficiency;

wherein the efficiency of the refrigeration system is based upon a measured temperature of air output by the refrigeration system.

2. The method according to claim 1, further comprising repeating the steps of: establishing the baseline efficiency, inputting the supplemental amount of refrigerant, measuring the adjusted efficiency, and comparing the baseline efficiency to the adjusted efficiency.

3. The method according to claim 2, wherein the steps of establishing the baseline efficiency, inputting the supplemental amount of refrigerant, measuring the adjusted efficiency, and comparing the baseline efficiency to the adjusted efficiency are repeated until a comparison of the measured adjusted efficiency to the baseline efficiency yields a predetermined result.

4. A method of charging a refrigeration system according to claim 2, wherein the step of inputting the supplemental amount of refrigerant includes inputting decreasing supplemental amounts of refrigerant in at least two successive inputting steps.

5. A method of charging a refrigeration system according to claim 2, wherein a subsequent step of establishing the baseline efficiency of the refrigeration system includes the prior step of measuring the adjusted efficiency of the refrigeration system.

6. A method according to claim 1, wherein each of the measuring the efficiency steps includes performing the measuring after a stabilization period.

7. The method according to claim 1, wherein the step of inputting the supplemental amount of refrigerant and subsequent step of measuring the adjusted efficiency step are iteratively repeated until a temperature measurement following the step of inputting is greater than a temperature measurement prior to the step of inputting.

8. The method according to claim 7, wherein an amount of refrigerant added in the last inputting step is purged from the refrigeration system.

9. The method according to claim 7, wherein the inputting step and subsequent measuring the adjusted efficiency are iteratively repeated until the measured temperature substantially stabilizes.

10. The method according to claim 1, wherein the refrigerant is carbon dioxide.

11. A system for charging a refrigeration system of a vehicle, comprising:

a controller;

a refrigerant source including a refrigerant;

at least one line adapted for connection to a connection point on the refrigeration system to fluidly connect the refrigerant source to the refrigeration system;

a control valve disposed to control flow of the refrigerant from the refrigerant source to the refrigeration system, the control valve being controllable by the controller; and an efficiency sensor for measuring the efficiency of the refrigeration system, wherein an executable instruction set arranged, when executed by the controller, to cause the system to perform the steps of:

inputting into the refrigeration system from the refrigerant source a predetermined amount of refrigerant less than a recommended refrigerant charge amount, establishing a baseline efficiency of the refrigeration system using the data from the efficiency sensor, inputting a supplemental amount of refrigerant from the refrigerant source into the refrigeration system, measuring an adjusted efficiency of the refrigeration system using data from the efficiency sensor, and comparing the measured adjusted efficiency to the baseline efficiency using the controller;

wherein the efficiency of the refrigeration system is based upon a measured temperature of air output by the refrigeration system.

12. The system according to claim 11, wherein the efficiency sensor is a thermocouple.

13. The system according to claim 11, wherein the refrigerant is carbon dioxide.

14. The system according to claim 11, wherein the controller directs the control valve to halt inputting of refrigerant into the refrigeration system after a comparison of the measured adjusted efficiency to the baseline efficiency yields a predetermined result.

* * * * *